March 20, 1956 H. S. BEATTIE Re. 24,131

HIGH SPEED PRINTING MECHANISM

Original Filed Feb. 17, 1948 7 Sheets-Sheet 1

March 20, 1956 H. S. BEATTIE Re. 24,131

HIGH SPEED PRINTING MECHANISM

Original Filed Feb. 17, 1948 7 Sheets-Sheet 2

INVENTOR
HORACE S. BEATTIE
BY Joseph B. Tapham
ATTORNEY

March 20, 1956 H. S. BEATTIE Re. 24,131

HIGH SPEED PRINTING MECHANISM

Original Filed Feb. 17, 1948 7 Sheets-Sheet 3

INVENTOR.
HORACE S. BEATTIE
BY
Joseph B. Taylor
ATTORNEY

HIGH SPEED PRINTING MECHANISM

Original Filed Feb. 17, 1948 7 Sheets-Sheet 4

INVENTOR.
HORACE S. BEATTIE
BY Joseph B. Tapleson
ATTORNEY

HIGH SPEED PRINTING MECHANISM

Original Filed Feb. 17, 1948 7 Sheets-Sheet 5

INVENTOR.
HORACE S. BEATTIE
BY
Joseph B. Tapham
ATTORNEY

HIGH SPEED PRINTING MECHANISM

Original Filed Feb. 17, 1948 7 Sheets-Sheet 6

INVENTOR.
HORACE S. BEATTIE
BY
Joseph B. Tapham
ATTORNEY

HIGH SPEED PRINTING MECHANISM

Original Filed Feb. 17, 1948 7 Sheets-Sheet 7

INVENTOR.
HORACE S. BEATTIE
BY Joseph B. Tapham
ATTORNEY

United States Patent Office

Re. 24,131
Reissued Mar. 20, 1956

24,131

HIGH SPEED PRINTING MECHANISM

Horace S. Beattie, Dutchess County, N. Y., assignor to International Business Machines Corporation, New York, N. Y., a corporation of New York

Original No. 2,661,683, dated December 8, 1953, Serial No. 8,929, February 17, 1948. Application for reissue March 14, 1955, Serial No. 494,303

22 Claims. (Cl. 101—93)

Matter enclosed in heavy brackets [ ] appears in the original patent but forms no part of this reissue specification; matter printed in italics indicates the additions made by reissue.

This invention relates to printing devices and more particularly to printing devices controlled by designations in a record to print a succession of characters.

The principal object of the invention is to provide a novel high speed printing apparatus in which a plurality of characters are spaced in columns and rows on the surface of the segment of a sphere whose spheric center is located opposite a printing point past which a receiving strip or sheet is fed. To select a character for printing, the segment is tilted to bring the desired character opposite the printing point. Thereafter, the segment with its center is thrown bodily against the paper to make an impression thereon of the selected character.

A more specific object of the invention is to provide a simple control mechanism for selectively positioning the spherical segment so that it moves directly from one character to the next without returning to its initial position.

A still further object of the invention resides in the provision of a record sensing mechanism for sensing character designations in a record card or strip in successive order and during uninterrupted movement of the strip with the character selecting devices coordinated so that each succeeding designation is sensed while an impression is being taken in accordance with the preceding selection.

Other objects of the invention will be pointed out in the following description and claims and illustrated in the accompanying drawings, which disclose, by way of example, the principle of the invention and the best mode which has been contemplated of applying that principle.

Figure 6B:
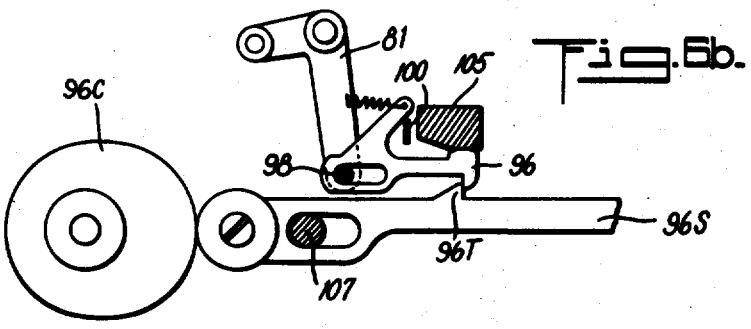
Figure 6A:
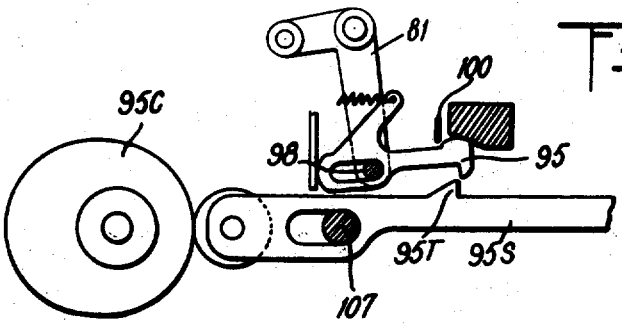
Figure 6:
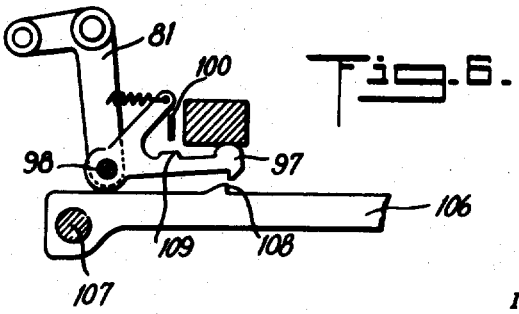

Figs. 6, 6a, and 6b are detail position views of parts of the selected mechanism.

Figure 7:
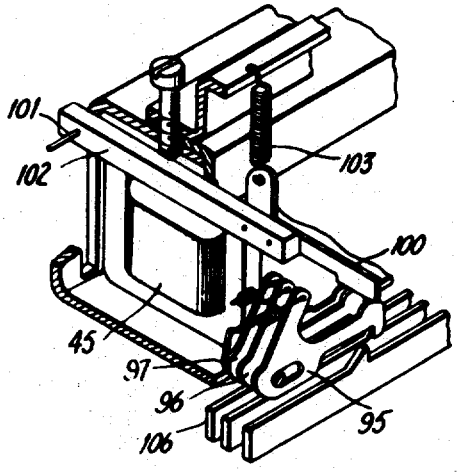

Fig. 7 is an isometric view of one of the selecting magnets and associated devices.

Figure 8:
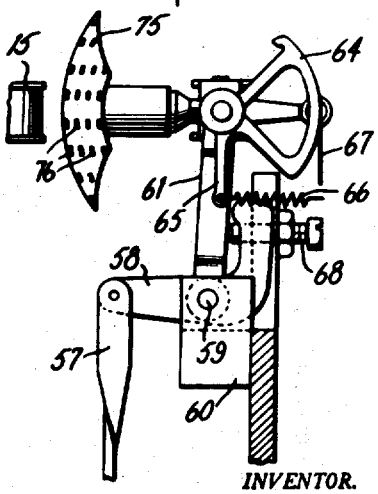

Fig. 8 is a detail of the type carrier and its supporting elements.

Figure 9:
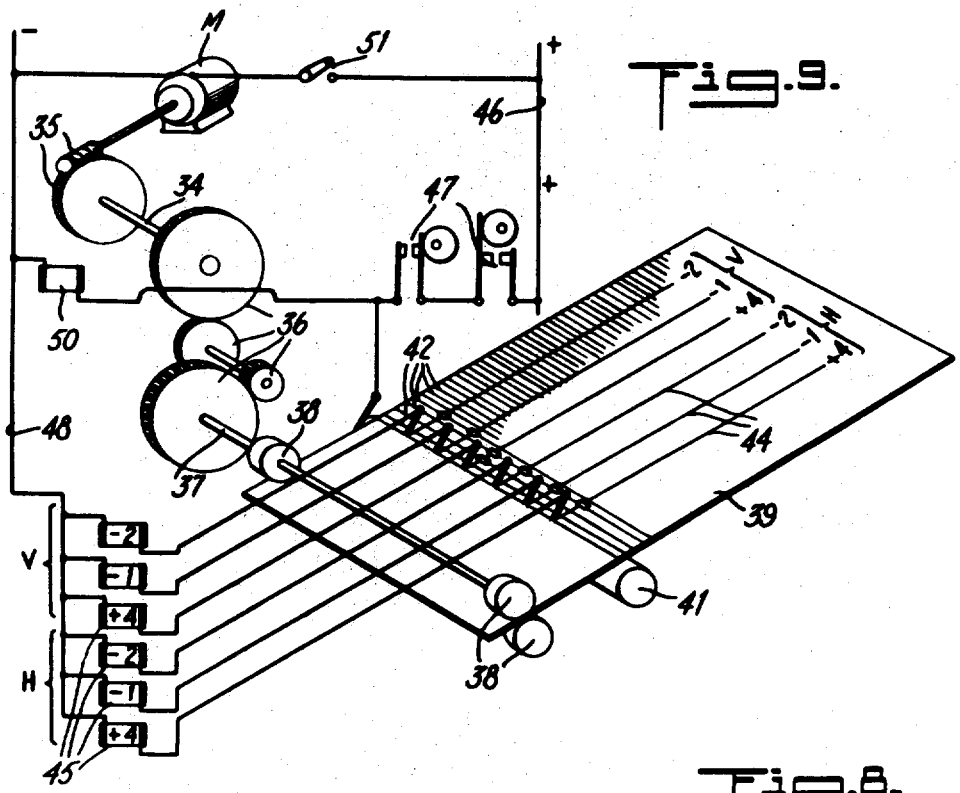

Fig. 9 is a wiring diagram with the record sensing mechanism incorporated therein.

Figure 10:
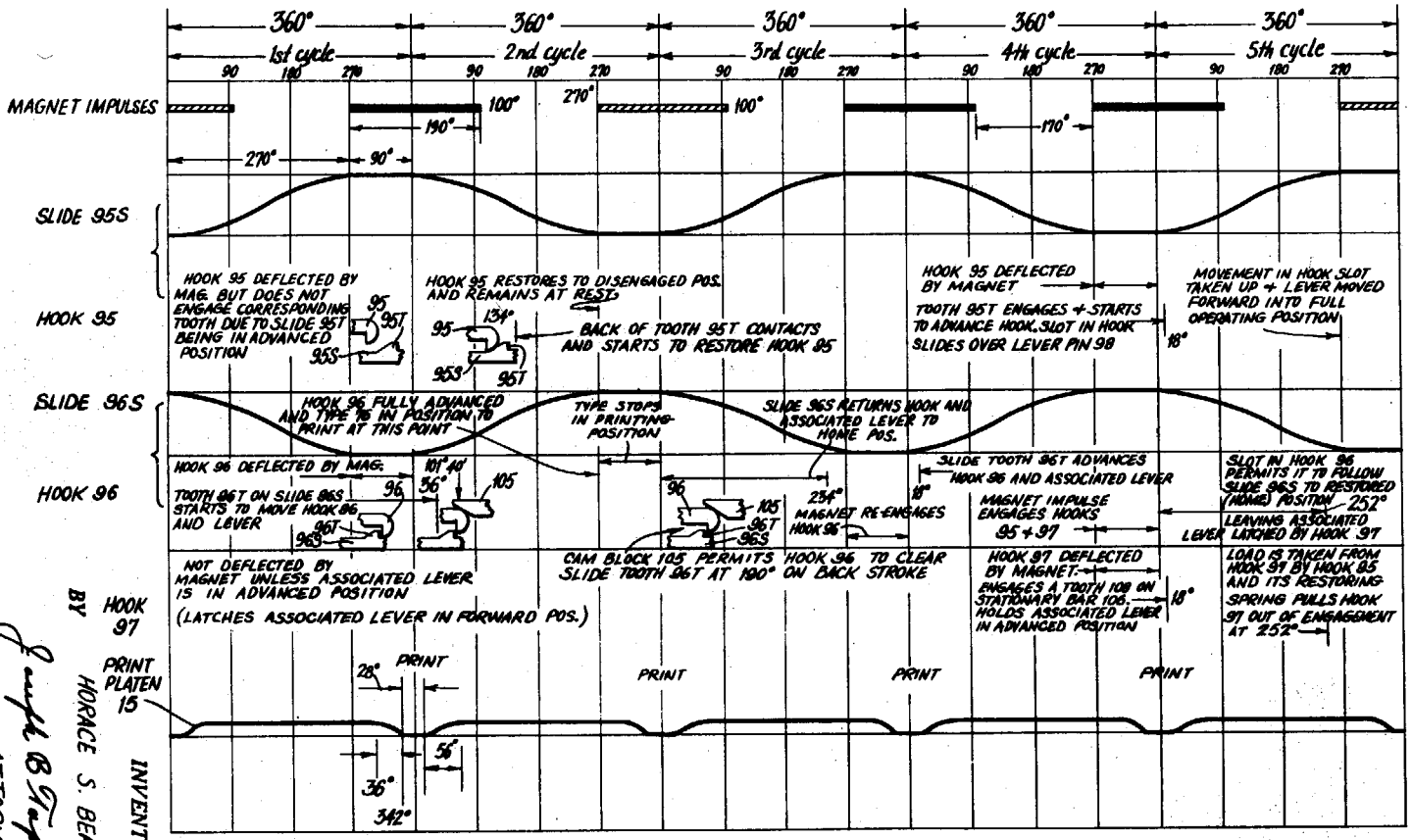

*Fig. 10 is a chart depicting the timing of various components of the apparatus.*

Figure 1:
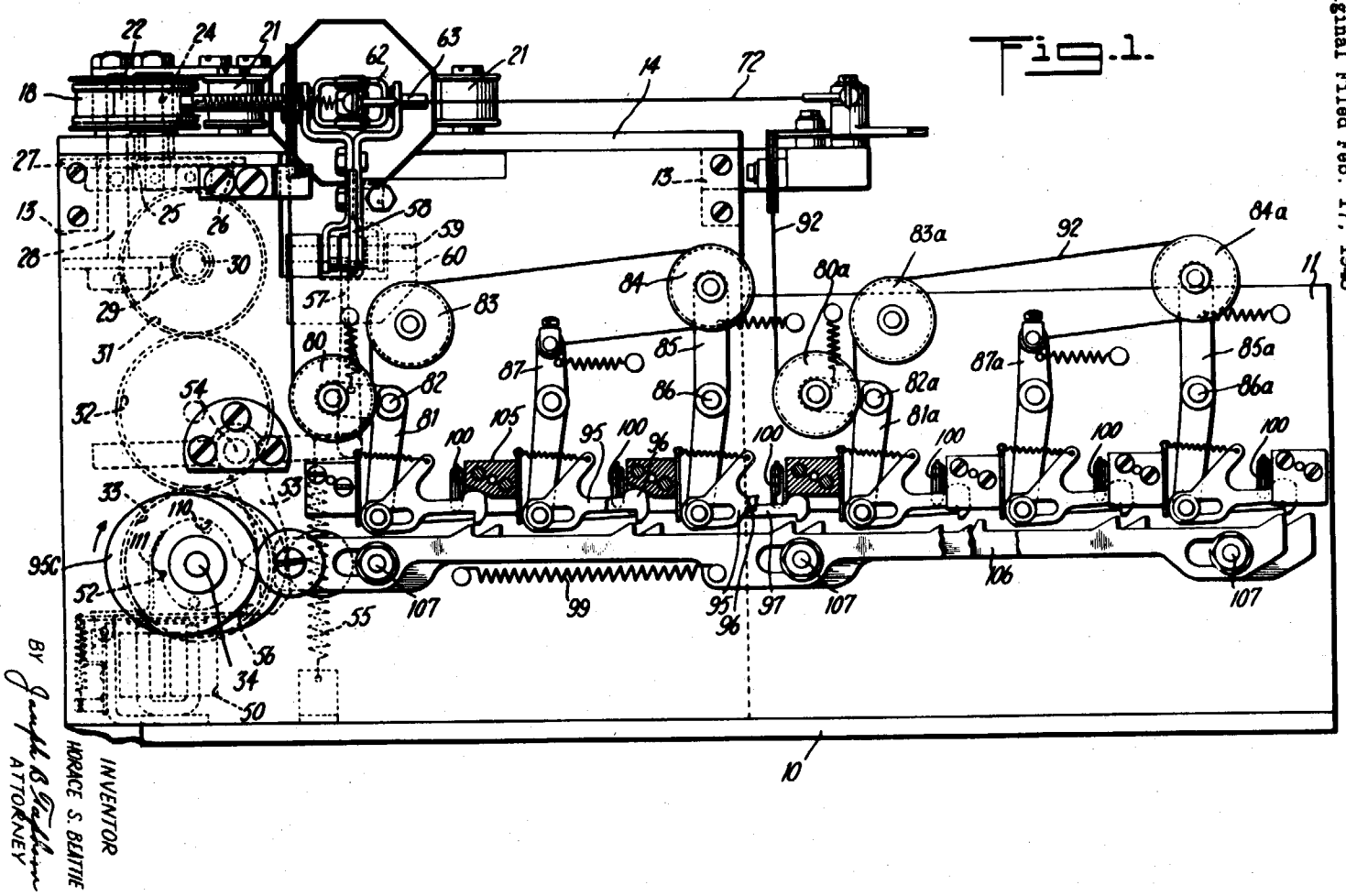
Fig. 1 is a front elevation of the apparatus.
Figure 2:
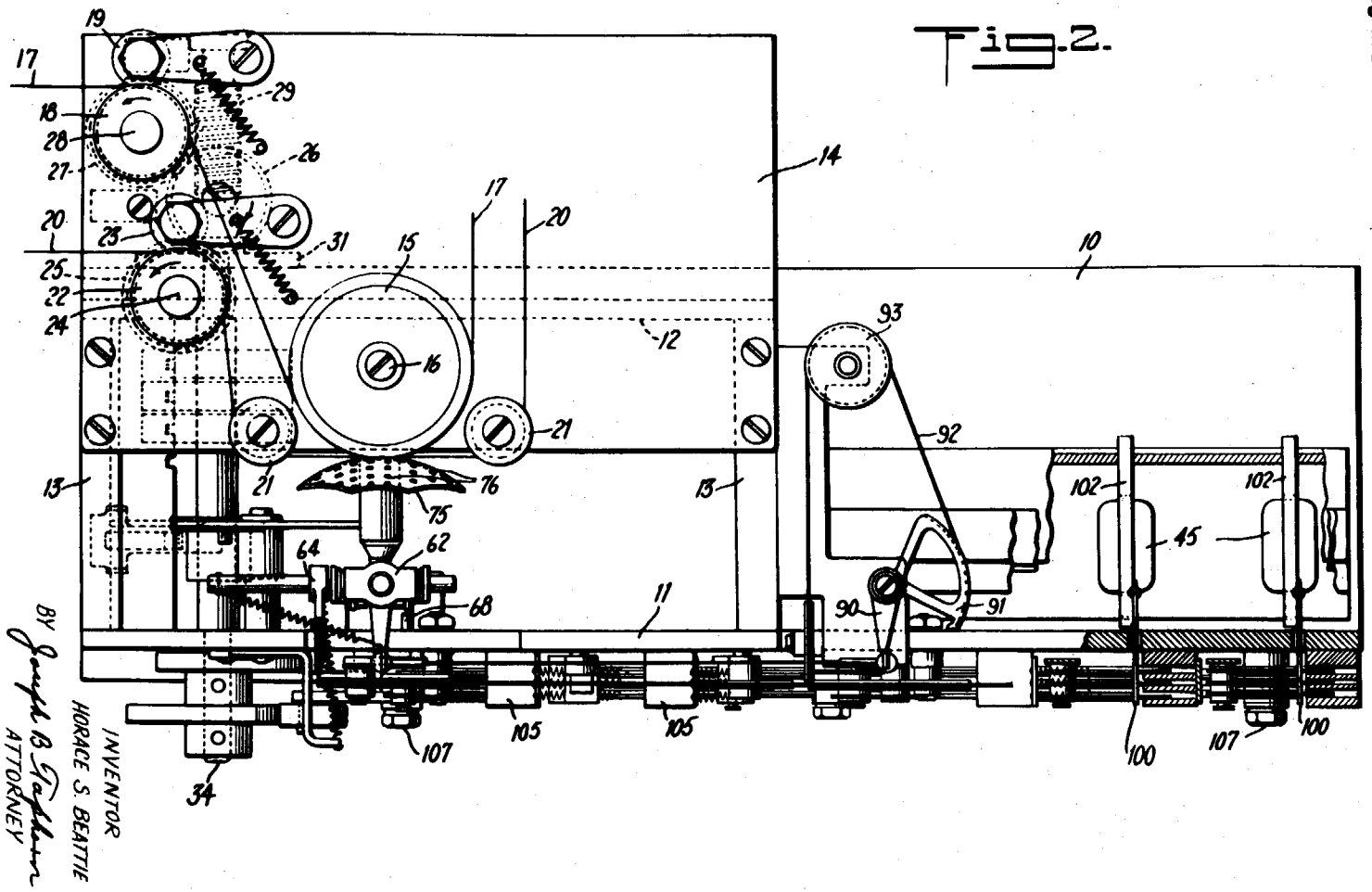
Fig. 2 is a plan elevation of the apparatus.

Referring to Figs. 1 and 2, the apparatus is supported on a base 10 to which is secured a vertical front plate 11 and back plate 12 tied together by cross bars 13. The top plate 14 fastened to cross bars 13 supports the paper and ribbon mechanism. The printing platen is represented at 15 (Fig. 2) and is rotatable on a stud 16 in plate 14. A paper strip 17 is fed from a suitable supply roller around the platen and between a feed roller 18 and spring-pressed follower 19. An ink ribbon 20, fed from a suitable source, is guided across the platen in front of the paper strip 17 by guide rollers 21 and is advanced by a feed roller 22 and spring pressed follower 23.

Rod 24 upon which roller 22 is secured, carries a gear 25 (see also Fig. 1) which through an idler 26 meshes with a similar gear 27 on the rod 28 supporting paper feed roller 18. The rod 28 has worm and wheel connection 29 with a shaft 30 which carries a gear 31 meshing with an idler 32 which in turn meshes with a gear 33 secured to main drive shaft 34. This shaft is continuously driven, and through the chain of gearing traced, it will be noted that with the shaft 34 in motion the paper strip 17 and ink ribbon 20 move with a continuous uninterrupted motion.

Referring to Fig. 9, shaft 34 is diagrammatically represented as driven from a motor M through reduction gearing 35. Through further gearing generally designated 36 a shaft 37 is driven and this, through rollers 38, serves to feed a record card 39 past a row of sensing brushes 40 and contact roller 41 with a continuous movement.

The record card 39 is provided with columns designated 42 in which perforations 43 are combinationally made in six rows designated 44 to represent different characters. Rows 44 are divided into an upper set of three designated V and a lower set of three designated H with the individual rows in the sets designated as −2, −1, and +4.

The following Table I lists the characters that may be represented and the particular perforation combinations for each. Thus, for example, the numeral 2 is represented by holes in the +4 row of field V plus holes in all three rows of field H.

TABLE I

| | V | | | H | | |
|---|---|---|---|---|---|---|
| | −2 | −1 | +4 | −2 | −1 | +4 |
| # | | | X | | X | |
| 1 | | | X | | | |
| 2 | | | X | X | X | X |
| 3 | | | X | X | | X |
| $ | | X | X | X | | |
| 4 | | X | X | | X | |
| 5 | | X | X | | | |
| 6 | | X | X | X | X | X |
| 7 | | X | X | X | | X |
| 8 | | X | X | | X | X |
| / | X | | X | X | X | |
| 9 | X | | X | X | | |
| 0 | X | | X | | X | |
| A | X | | X | | | |
| B | X | | X | X | X | X |
| C | X | | X | X | | X |
| D | X | | X | | X | X |
| E | X | | X | | | X |
| . | X | X | X | X | X | |
| F | X | X | X | X | | |
| G | X | X | X | | X | |
| H | X | X | X | | | |
| I | X | X | X | X | X | X |
| J | X | X | X | X | | X |
| K | X | X | X | | X | X |
| ; | X | X | X | | | X |
| - | | | | X | X | |
| L | | | | X | | |
| M | | | | | X | |
| N | | | | X | X | X |
| O | | | | X | | X |
| P | | | | | X | X |
| % | | X | | X | X | X |
| Q | | X | | X | | |
| R | | X | | | X | |

*Table I.*—Continued

| | V | | | H | | |
|---|---|---|---|---|---|---|
| | −2 | −1 | +4 | −2 | −1 | +4 |
| S | | X | | | | |
| T | | X | | X | X | X |
| U | | X | | X | | X |
| V | | X | | | X | X |
| + | | X | | | | X |
| $ | X | | | X | | |
| W | X | | | | X | |
| X | X | | | | | |
| Y | X | | | X | X | X |
| Z | X | | | X | | X |
| * | X | | | | X | X |
| @ | X | X | | | X | |
| & | X | X | | | | |
| ) | X | X | | X | X | X |
| ( | X | X | | X | | X |

Each sensing brush 40 is connected to one of a group of magnets 45 which are designated to identify them with the rows with which each is associated. Thus, as the card passes brushes 40, the magnets 45 will be repeatedly energized in combinations corresponding to the perforation arrangement. The circuit extends from current line 46, through cam controlled contacts 47 (operated by cams on shaft 34), contact roller 41, holes in the card, brushes 40, magnets 45 to opposite line 48.

The gear ratio between shafts 34 and 37 is such that one column 42 of the card passes the line of brushes for each half revolution of shaft 34, and the contacts 47 are adjusted to repeatedly make and break the circuits while the columns are sensed.

A print magnet 50 is wired to contacts 47 so that it is energized once each half cycle of shaft 34 in time with the period of energization of magnets 45. In the operation of the device, card 39 is placed in position as diagrammatically shown with brushes 40 in advance of the first column of perforations. Thereafter, switch 51 is closed to supply current to motor M and shaft 34 will be driven to advance the card *and* contacts 47 will complete the sensing circuits and concurrently energize the print magnet 50.

Figure 3:
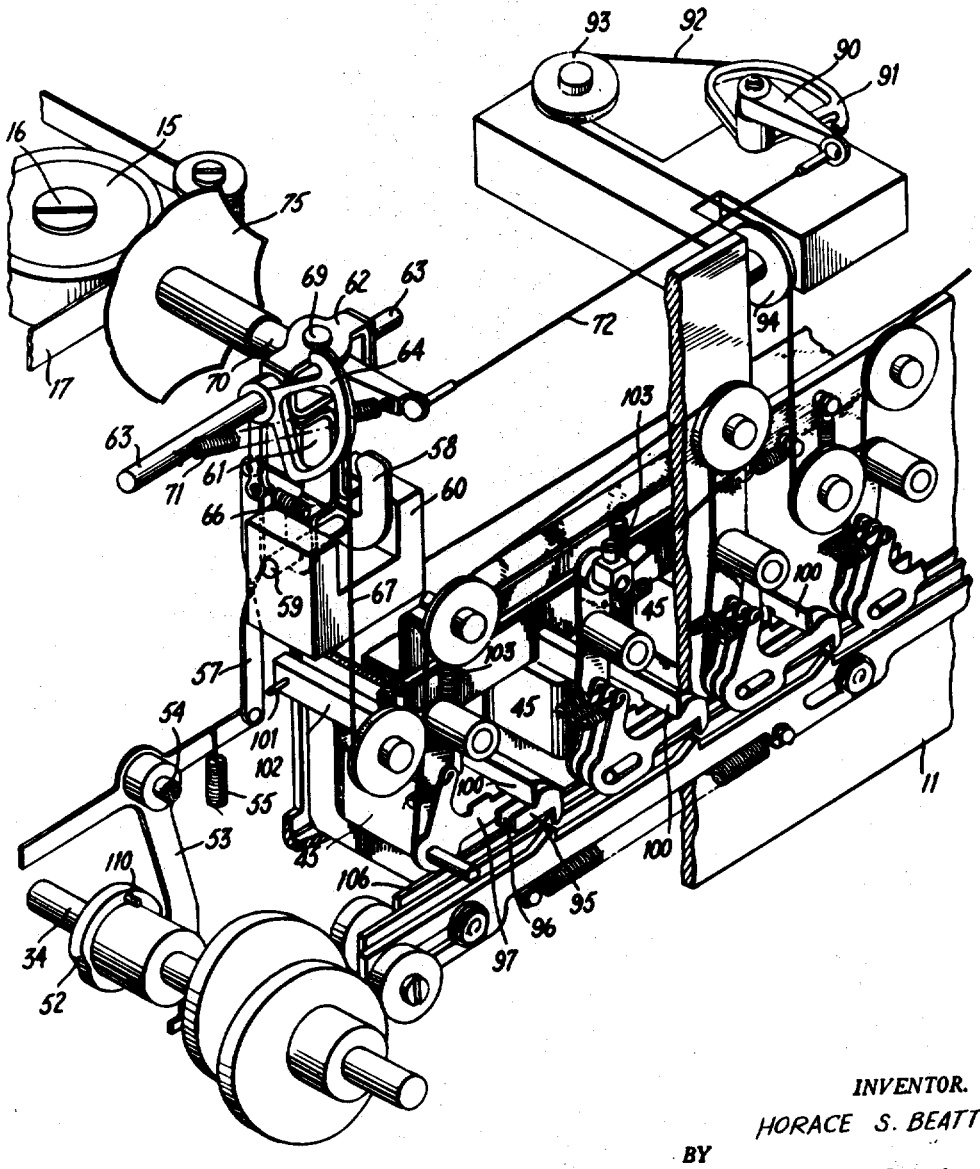
Fig. 3 is an isometric view showing part of the character selecting mechanism with the connections to the impression elements.

Referring now to Figs. 1 and 3, shaft 34 has secured thereto a cam 52 which cooperates with a bell crank follower lever 53 pivoted at 54 and normally biased by a spring 55 in a clockwise direction. The lower extremity of the lever is engaged by armature 56 of magnet 50, so that with the magnet deenergized, the lever is restrained against following the contour of the cam. Upon energization of magnet 50 with the parts in the relative position shown in Fig. 1, lever 53 is rocked by spring 55 to turn clockwise under control of the cam 52 and will draw a link 57 downwardly. Pins 110 in cam 52 serve to engage a finger 111 extending from armature 56 to restore the latter. The link 57 connects with a hammer 58 pivoted freely on a rod 59 supported by a block 60 secured to plate 11.

The rod 59 supports a vertical lever 61 (see Fig. 8) whose upper end carries a cage 62 having integral rods 63 extending through holes in the lever 61, so that the cage may oscillate in a vertical plane. Secured to one of the rods 63 is a pulley segment 64 with a finger 65 upon which a spring 66 acts to urge the segment in a counterclockwise direction. A cable 67 through selecting mechanism yet to be described, will draw the segment clockwise or will slacken to allow spring 66 to rock the segment counterclockwise. In the normal position of the parts as in Fig. 8, spring 66 acting through segment 64 urges lever 61 clockwise against a limit stop pin 68. Accordingly, when magnet 50 is energized, cam 52 will rock hammer 58 against the lever 61 to rock the latter in a counterclockwise direction.

Cage 62 has a vertical rod 69 therein to support a stem 70 which may thus oscillate in a horizontal plane about rod 69. A spring 71 extending between rod 63 and stem 70 (Fig. 3) biases the stem in one direction and a cable 72 through the selector mechanism may pull the stem in the opposite direction against the spring action or may slacken to allow the spring to rock the stem.

From the foregoing, it will be noted that a so-called universal joint is provided with the point of intersection of the axes of rods 69 and 63 constituting a point about which stem 70 can be rocked in any direction. The left end of stem 70 (as viewed in Figs. 3 and 8) has secured thereto a type carrier or head 75 which has a spherical surface whose spherical center is the point of intersection of the axes of rods 69 and [33] *63*. The stem 70 lies normally in the plane of platen 15, and as the stem is rocked universally, any point on its surface may be brought into the plane of the platen or more specifically into a line extending from the pivot point to the axis of the platen. Accordingly, if the carrier is so positioned and hammer 58 is then actuated, the presented point of the carrier will be impelled toward the platen and against the ribbon and paper therebetween.

Figure 5:
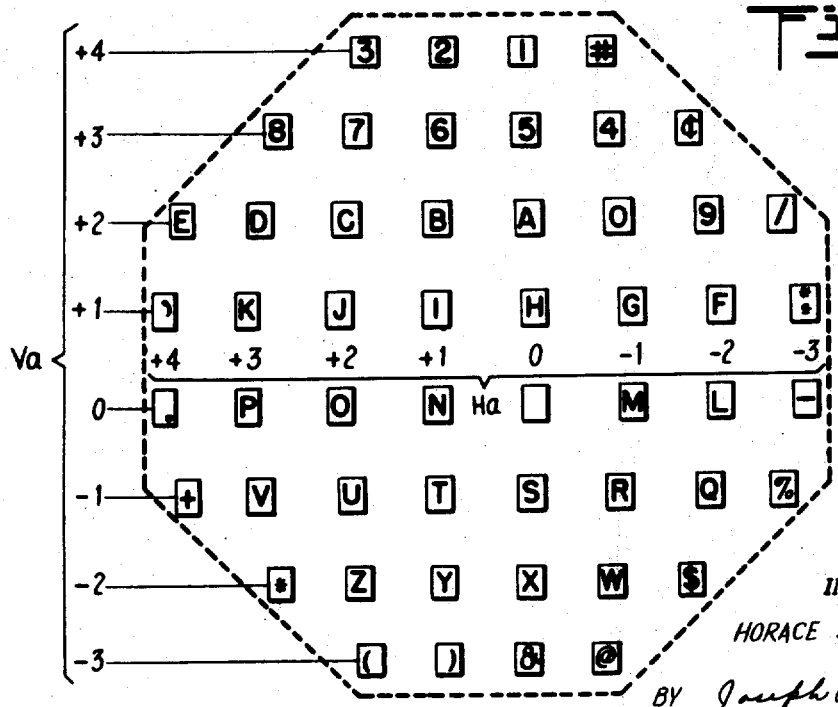
Fig. 5 is a diagram showing the arrangement of the characters on the impression element looking toward the platen.

A plurality of type characters 76 are disposed on the surface of the carrier 75 arranged vertically in great circles and longitudinally in chordal circles as shown in Fig. 5. In this figure the characters are viewed looking toward the platen and in normal or rest position a blank space directly below the character H is in line with the platen so that, if the hammer is actuated with the carrier in such position, no printing will take place.

To select a character for printing, the carrier is shifted up or down and right or left from its normal position to bring the character into the position initially occupied by the blank type element.

The horizontal rows or chordal circles are designated Va and the vertical columns or great circles are designated Ha, while the individual rows and columns are designated +4, +3, +2, +1, 0, −1, −2, and −3. These designations correspond to punching positions in the rows and columns of the record card wherein, if for the V and H fields the designated values for any character are algebraically added, the result will represent the extent of vertical and horizontal movement of the carrier to present the related type for printing such characters. For example, the letter B (see Table I) is represented by V values −2 and +4 and by H values −2, −1, and +4. Combining these algebraically, V equals +2 and H equals +1. Turning to Fig. 5, it is seen that the letter B lies at the intersection of the +2 chordal circle ordinate Va and the +1 great circle ordinate Ha, so that to present letter B for printing the carrier is to be shifted one column to the right and two rows down. In a similar manner, other characters may be inspected and from Table I the extent and direction of movement of the carrier may be determined to present such characters to the printing position.

Figure 4:
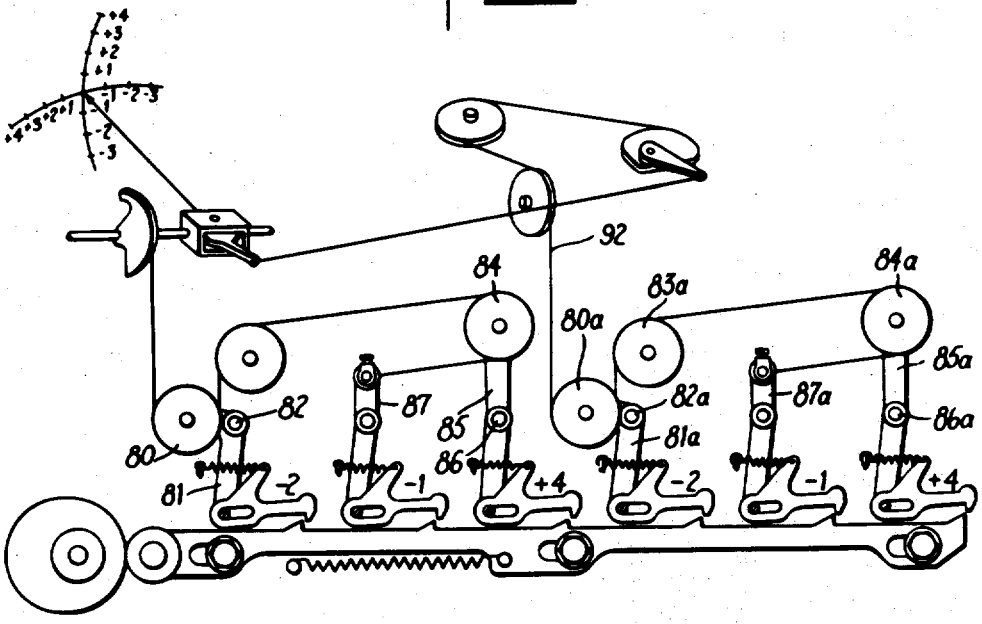
Fig. 4 is a diagram of the scheme of connections.

Vertical positioning mechanism.—There is provided a separate mechanism for effecting the vertical positioning and this will be first described. Referring to Figs. 1, 3, and 4, the cable 67 extends from segment 64 around a grooved wheel 80 mounted on an [armature] *arm* of bell crank 81 pivoted at 82, thence around a wheel 83 pivoted on the fixed plate 11, thence around a wheel 84 mounted on a lever 85 pivoted at 86 and thence to the upper end of a lever 87 to which it is secured.

The levers 81, 87, and 85 are all spring biased in a clockwise direction and may be rocked singly or in combination through the same angle in a counterclockwise direction. The parts are so proportioned that, if lever 85 is rocked alone, cable 67 will be slackened *to allow spring 66* to rock the carrier vertically to bring its +4 line of characters along the printing line. If lever 87 is rocked alone, cable 67 will be [given slack so that its spring 66 will] *tighten to* rock the carrier vertically to bring its −1 row to the printing line. If lever 81 is rocked alone, cable 67 will be [given sufficient slack so that spring 66 will] *tightened to* rock the carrier vertically to bring its —2 row to the printing line. Obviously, when the levers are rocked in combination the remaining rows will be selected. Thus,

| To select row Va | Levers rocked |
|---|---|
| +3 | 85 (+4), 87 (−1) |
| +2 | 85 (+4), 81 (−2) |
| +1 | 85 (+4), 81 (−2), 87 (−1) |
| −3 | [4] 81 (−2), 87 (−1) |

Horizontal positioning machines.—Cable 72 (Figs. 1, 3 and 4) connects at its right end to an arm 90 integral with a segment 91 from which a cable 92 extends around wheels 93 and 94 and thence around a system of wheels corresponding to the system around which cable 67 extends. The components of this latter system are identified by the same numerals as corresponding parts for cable 67, but distinguished by the letter a suffixed thereto.

In the same manner the levers 81a, 87a, and 85a are related to the values −2, −1, and +4, respectively, and again rocking of the levers through the same angle singly or in combination will rock the carrier in a left or right direction to select an appropriate column of the carrier. Thus,

| To select column Ha | Levers rocked |
|---|---|
| +4 | 85a (+4) |
| +3 | 85a (+4) 87a (−1) |
| +2 | 85a (+4), 81a (−2) |
| +1 | 85a (+4), 81a (−2), 87a (−1) |
| −1 | 87a (−1) |
| −2 | 81a (−2) |
| −3 | 81a (−2), 87a (−1) |

Each of the levers 81, 87, 85, and its counterpart 81a, 87a, and 85a has pivoted thereto at its lower extremity a pair of identical interposer hooks designated 95 and 96 and a latching hook 97. These hooks are shown separately in Figs. 6, 6a, and 6b where it is seen that hooks 95 and 96 are slotted for sliding action on a pin 98 in the end of lever 81 (in example) while hook 97 is not slotted. All the hooks are spring biased in a counterclockwise direction.

The six hooks 95 lie in a common plane and in the plane of a slide 95S which is mounted for horizontal reciprocation on posts 107. Spring 99 serves to move it to the left while a cam 95C shifts it to the right. There is a tooth 95T for each hook 95 proportioned so that as shaft 34 rotates, slide 95S will reciprocate its teeth 95T below the hooks and, if a hook is rocked about its pin 98, the hook will be engaged and therebetween the related lever 81 (for example) will be forcibly rocked through a predetermined angle.

The six hooks 96 also lie in a common plane and in the plane of a slide 96S which is mounted in the same manner as slide 95S and is actuated by a cam 96C on shaft 34 which has the same configuration as cam 95C but is mounted on the shaft with a 180° displacement, so that slides 95S and 96S are reciprocated oppositely. Slide 96S has a tooth 96T for each hook 96 and, if one of these hooks is rocked, it will be engaged by a related tooth to rock the related lever counterclockwise.

The mechanism for rocking hooks 95, 96 comprises a lever 100 (Figs. 3 and 7) of which there is one provided for each of the six sets of hooks (see Fig. 1). This lever is pivoted at 101 and is integral with armature 102 of a magnet 45 and is biased upwardly by a spring 103. The magnets 45 are selectively energized as explained in connection with the circuit of Fig. 9.

The sequence of operations is as follows. When a perforated column 42 of the record card 39 is beneath the sensing brushes 40, contacts 47 close to complete circuits to magnets 45 in accordance with the coding of the character sensed and the corresponding levers 100 will be rocked to tilt the related hooks 95, 96. Shortly thereafter, one or another of the slides 95S, 96S will move to the right, engage and carry with it the tilted hooks and connected levers. These, through the differential pulley wheel and cable connections to the carrier will thereupon rock the carrier selectively in the appropriate direction to present the character corresponding to the combination of holes sensed to the printing line, and at such time while the advanced slide 95S or 96S is in its extreme position, cam 52 will trip the hammer 58 to throw the carrier against the platen and effect an impression on the tape.

It will be noted in Fig. 6b that as a hook (96) is advanced by a tooth in its related slide the free end of the hook slides beneath a stationary block 105 which locks the hook in engagement with tooth 96T and enables restoration of lever 100 shortly after slide 96S has begun to move.

When the advanced slide is in its extreme position and just before it begins to return, the circuit through the controlling card column will have been broken and the next column will be at the sensing brushes. The alternate slide will be about to begin its advance and circuits will be completed to the magnets 45 in accordance with the combinational punching in this next card column to rock a new set of hooks accordingly for advance by the alternate slide, while those previously advanced return as the first slide moves to the left.

Provision is made so that, where a selected and advanced hook is again selected in response to the sensing of the next card column, such hook is not restored but is caused to remain in advanced position. For this purpose a bar 106 (Figs. 1, 3, and 6) is provided which is fixedly mounted on posts 107 and has teeth 108 lying in the plane of movement of the latching hooks 97. When any lever (such as 81) is rocked, it will advance its hook 97 to the position of Fig. 6 wherein a raised shoulder 109 will lie beneath lever 100. If now the same advanced lever is to be selected for the card column, i. e., in the next ½ revolution of the shaft 34, the related lever 100 will be actuated with hook 97 in the position of Fig. 6 and the hook will be tilted to engage adjacent tooth 108 in bar 106. This latching action takes place while the second slide is advancing and is maintained by frictional engagement of the hook 97 with tooth 108, since at such time lever 81 is spring biased clockwise and exerts a leftward pull on the hook. A slight undercutting of tooth 97 serves to assist in maintaining the latched relationship until the newly advanced hook 95 or 96 picks up the lever and gives it a slight overthrow sufficient to release the contact between 97 and 108.

The net effect of this latching action is to obviate the return of the carrier to home position between successive printing operations and, where the same character is punched in successive columns, the carrier will be positioned upon the first sensing of the character and then latched in such position for repeated printing therefrom.

Obviously, where the next character lies in the same row or column, that row or column will have its selecting connections latched so that the carrier is simply repositioned along the previously selected row or column to the new character therein. To be more specific if (referring to Fig. 5) the letter Q is first selected, the carrier is moved up one row and to the left two columns. If the next character selected is the letter U, the carrier remains in its upward position but shifts four columns to the right.

By providing alternately operating slides 95S and 96S, high speed of operation is attained since while one slide is effecting a selection the other is being restored and by providing the further latching mechanism restoration of levers required in the next selection is obviated and the extent of movement of the carrier is only that required to move directly from one character to the next without an intervening homing action. Due to the high speed so obtainable, the card can be sensed in motion and the tape or entry receiving medium may also be in motion when the carrier is impelled against it.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a printing apparatus, a type carrier having a surface forming part of a sphere and having a plurality of characters arranged in a great circle on said surface, means for mounting said carrier for oscillation on its spheric center, means normally biasing the carrier in one direction, restraining means therefor, a device for releasing said restraining means to enable the biasing means to rock the carrier in said one direction a fixed predetermined extent, a further device for rocking the carrier in the opposite direction against its biasing means a fixed extent less than said predetermined extent, and means for selectively rendering either or both of said devices effective, whereby the carrier will rock through a distance equal in extent and direction to either of said extents or to the resultant of the devices operated, respectively.

2. In a printing apparatus, a type carrier having a surface forming part of a sphere and having a plurality of characters arranged in a great circle on said surface, means for mounting said carrier for oscillation on its spheric center, means normally biasing the carrier in one direction, restraining means therefor, a device for releasing said restraining means to enable the biasing means to rock the carrier in said one direction a predetermined extent, a second device for rocking the carrier in the opposite direction against its biasing means one-half of said predetermined extent, a third device for rocking the carrier in the opposite direction against its biasing means one-quarter of said predetermined extent, and means for selectively rendering all or any lesser number of said devices effective, whereby the carrier will rock through an extent equal in extent and direction to the resultant of the devices operated.

3. In a printing apparatus, a type carrier having a surface forming part of a sphere and having a plurality of characters spaced thereon, means for mounting said carrier for oscillation on its spheric center, a printing platen, said surface being normally positioned with its center opposite the platen, means for rocking the carrier in one direction, a second means for rocking the carrier in a transverse direction, control mechanism for rendering both said rocking means jointly effective to bring a selected character into printing position, latching devices for each rocking means, and means for rendering either of said latching devices effective to latch the related rocking means to thereby hold the carrier in rocked position for the related direction.

4. In a cyclically operable printing apparatus, means for sensing a record for character designations arranged in columns, said means sensing a column for each cycle of operation, a type carrier having a surface forming part of a sphere and having a plurality of characters spaced thereon, means for mounting said carrier for oscillation on its spheric center, a printing platen, an impression effecting device, selecting devices controlled by the sensing means for selecting a character for printing, means controlled by the selecting devices for rocking the carrier to present the selected character to the platen, and cyclically operable control mechanism comprising dual actuating members operative in alternate cycles to alternately rock the carrier and for causing said sensing, selecting, rocking and impression effecting means to operate in the order named for each cycle of operation, and in which the order of operations is such that operation of the impression effecting means in response to the sensing of one column is concurrent with the sensing of the designations in the next column.

5. In a printing apparatus, a type carrier having a surface forming part of a sphere and having a plurality of type elements spaced thereon, movable to pass through a printing position, and means for moving said carrier to present a selected element to the printing position, comprising a wire connected to the carrier at one end, a plurality of pulleys, an anchor, said wire extending from the carrier and looped partly around each pulley to said anchor, and means for selectively varying the positions of said pulleys toward or away from one another to thereby move the carrier an amount corresponding to the extent of movement of the pulleys and spring means acting on the carrier to keep the wire taut.

6. In a printing apparatus, a type carrier having a surface forming part of a sphere and having a plurality of type elements spaced thereon, movable to pass through a printing position, and means for moving said carrier to present a selected element to the printing position, comprising a wire connected to the carrier at one end, a pulley located to normally maintain a bend in the wire, an anchor, said wire extending from the carrier and partly around said pulley to said anchor, and means for moving the pulley away from the wire a predetermined extent to create a slack in the wire, and a spring on the carrier to take up the slack so produced to thereby move the carrier to present a selected element to said printing position.

7. In a printing apparatus, [a type carrier] *a part having a normal position and movable to a second position, means for biasing said part to its normal position,* [positioning mechanism for said carrier, including] a pair of driven elements *mounted on said part so as to have one-way driving connections therewith,* [both arranged to position the carrier,] a pair of cyclically operable actuators, one for each driven element, operable in alternate cycles, so that as one advances, the other restores, *selectively actuable* means for [engaging] *disposing* both said elements *for engagement* with their actuators during a given cycle, whereby the actuator advancing in such cycle will drive the related driven element to [position] *move* the [carrier] *part from the normal to the second position,* spring means for causing the advanced driven element to return with its actuator during the next cycle, and means effective to prevent [said] *the* return *of said part with the advanced driven element* if said elements are [engaged] *disposed for engagement* with the actuators during the said next cycle [, whereby the carrier will be retained in the position to which it was moved].

8. In a printing apparatus, a type carrier, mounted for movement through a plurality of equally spaced positions, an anchor, a wire connected between said carrier and anchor to normally hold the carrier in a home position, said carrier being spring biased against the wire to hold it taut, guides normally positioned to hold said wire in a path of predetermined configuration, and means for selectively changing the positions of said guides and anchor to alter the path of the wire and thereby move the carrier to a selected one of its other positions.

9. The invention set forth in claim 8 in which one of the guides is positionable to move the carrier a distance of one space, another guide is positionable to move the carrier through four spaces, and the anchor is positionable to move the carrier through two spaces, said selective means being effective to change the positions of one or all guides and anchor to effect a cumulative movement of the carrier.

10. In a printing apparatus, a type carrier having a plurality of columns and rows of type elements thereon, a first operating wire connected to said carrier, means for drawing said wire to move the carrier for presentation of an element in a predetermined row, a second operating wire connected to said carrier, means for drawing said second wire to move the carrier for presentation of an element in a predetermined column, and means for rendering both said drawing means concurrently effective to present the element related to said predetermined column and row, said drawing means comprising an anchor to which the wire is connected, a pulley bearing against the wire at a point intermediate the carrier and anchor, and power operated means for causing the pulley to move against the wire a predetermined extent.

*11. In a printing apparatus, an element positionable according to the character to be printed, means for mounting said element for movement, means for moving the element in one direction, a second means for moving the element in a second direction, control mechanisms for rendering the respective moving means individually or jointly effective to position said element, latching devices for each of said means, and means operable by the respective control mechanisms for rendering the corresponding latching devices effective to hold the related moving means if the element is already in the moved position for the related direction.*

*12. In a mechanism, a reciprocable actuator, an element to be moved from a normal to a second position, means for drivenly connecting the element to the actuator during one range of the latter's movement for movement from the normal to the second position, means normally operative to return said element to the normal position during another range of the actuator's movement, a fixed part, and other means operative to connect the element to the fixed part when the former is in the second position to prevent a return thereof to the normal position when the actuator returns.*

*13. In a mechanism, a reciprocable actuator, an element having a normal position and movable to a second position, means for biasing said element to the normal position, first means operable to connect the element to said actuator during one range of the latter's movement for movement from the normal to the second position, selectively actuable means for operating the first means, a fixed part, and other means operable by said selectively actuable means to connect the element when it is in its second position to said part to prevent the return of the element when the actuator restores.*

*14. In a mechanism, a pair of actuators reversely reciprocable between home and advanced positions, a member movable from a normal position to which it is biased to a second position, first means operable to drivenly connect the member when in home position to the actuator being moved from home position for movement to the second position, a fixed part, and other means operative to connect the member to the fixed part if the first means is operated while the other actuator is being moved from home position and the member is already in the second position.*

*15. In a mechanism for displacing an object different amounts, a pair of actuators reversely reciprocable between home and advanced positions, a plurality of members each of which is movable from a normal position to which it is biased to a second position, first means operatively connecting said members with said object to impart corresponding increments of displacement thereto when they are moved from the normal to the second positions, second means for the respective members operable to connect them to the actuator being moved from home position for movement to the second position, a fixed part for each of said members, third means for each of the respective members operable to connect the member to the corresponding fixed part when the member is in the second position, and selectively actuable means for the respective members effective to operate the corresponding second and third means.*

*16. In a cyclically operated print mechanism wherein successive characters are designated in respective cycles by combinations of one or more different signals of a set, an impression determining element positionable according to the character to be printed, a pair of actuators reversely reciprocable between home and advanced positions in every two cycles, members for each of the possible different signals of a set and each movable from a normal position to which it is biased to a second position, first means operatively connecting said members with said impression determining element to impart corresponding increments of displacement thereto when they are moved from the normal to the second positions, second means for the respective members operable to connect them to the actuator being moved from home position in that cycle for movement to the second position, a fixed part for each of said members, third means for each of the respective elements operable to connect the member to the corresponding fixed part when the member is in the second position, and other means for each of the possible different signals of a set actuable thereby to operate the second and third means for the corresponding members.*

*17. In a device for disposing a member biased to a normal position in a second position, a cyclically reciprocable actuator, a first pawl pivotally mounted on said member and biased to a normal position out of the path of said actuator, a fixed part, a second pawl pivoted on said element and biased to a normal position in which its path is not interrupted by said fixed part, and means operable to move the first pawl into the path of said actuator if the member is in the normal position to cause the actuator to move the member to the second position to position the second pawl so that the fixed part lies in its return path if the member is already in the second position to prevent the member from restoring when the actuator restores.*

*18. In a device for disposing a member biased to a normal position in a second position, a first and a second actuator reversely reciprocable between home and advanced positions, a first and a second pawl slidably and pivotally mounted on said member and biased to normal positions out of the path of the respective actuators, a third pawl pivoted on said member and displaceable therewith, a fixed part so located as to enable the third pawl to be moved therebehind when the member is in the second position, and means operable to move the first and second pawls for the driven engagement of one with the corresponding one of the actuators being moved from home position to move the member to the second position if it is in the normal position and to move the third pawl behind the fixed part if the member is already in the second position to prevent its return towards the normal position when the actuator in the advanced position restores toward home position.*

*19. In a device for disposing a member biased to a normal position in a second position, a first and a second actuator reversely reciprocable between home and advanced positions, a stop, a first and a second pawl slidably and pivotally mounted on said member and biased to normal positions out of the path of the respective actuators and in engagement with said stop, a third pawl pivoted on said member and displaceable therewith, a fixed part so located as to enable the third pawl to be moved therebehind when the member is in the second position, and means operable to move the first and second pawls for the driven engagement of one with the corresponding one of the actuators being moved from home position to move the member to the second position if it is in the normal position and to move the third pawl behind the fixed part if the member is already in the second position to prevent its return towards the normal position with the return of the driven pawl toward the stop when the actuator in the advanced position restores toward home position.*

*20. In a device for disposing a member biased to a normal position in a second position, a first and a second actuator reversely reciprocable between home and advanced positions, a stop, a guide, a first and a second*

*pawl slidably and pivotally mounted on said member and biased to normal positions in engagement with said stop and said guide and out of the path of the respective actuators, a third pawl pivoted on said member and displaceable therewith and biased to a normal relationship in engagement with said guide, a fixed part so located as to enable the third pawl to be moved therebehind when the member is in the second position, and means operable to move the first and second pawls from the guide for the driven engagement of one with the corresponding one of the actuators being moved from home position to move the member to the second position if it is in the normal position and to move the third pawl from engagement with the guide and behind the fixed part if the member is already in the second position to prevent its return towards the normal position with the return of the driven pawl towards the stop when the actuator in the advanced position restores toward home position.*

*21. In a device for disposing a member biased to a normal position in a second position, a first and a second actuator reversely reciprocable between home and advanced positions, a stop, a guide, a first and a second pawl slidably and pivotally mounted on said member and biased to normal positions in engagement with said stop and said guide and out of the path of the respective actuators, the normal position of said member being determined by engagement with said pawls in engagement with said stop, a third pawl pivoted on said member and displaceable therewith and biased to a normal relationship in engagement with said guide, a fixed part so located as to enable the third pawl to be moved therebehind when the member is in the second position, and means operable to move the first and second pawls from the guide for the driven engagement of one with the corresponding one of the actuators being moved from home position to move the member to the second position if it is in the normal position and to move the third pawl from engagement with the guide and behind the fixed part if the member is already in the second position to prevent its return towards the normal position with the return of the driven pawl towards the stop when the actuator in the advanced position restores toward home position.*

*22. In an apparatus, a part movable from a normal to a second position, means for biasing said part to its normal position, cyclically operated means for moving said part from the normal to the second position and thereafter allowing it to restore, optionally actuable means for drivingly connecting the cyclically operable means to the part to enable it to move the part from the normal to the second position, and latch means operable by the optionally actuable means if the latter is actuated again before the part has moved from the second position to hold the part in the second position for the ensuing cycle.*

References Cited in the file of this patent or the original patent

UNITED STATES PATENTS

| | | |
|---|---|---|
| 393,259 | Perry | Nov. 20, 1888 |
| 420,692 | Miller | Feb. 4, 1890 |
| 435,654 | Perry | Sept. 2, 1890 |
| 442,021 | Davenport | Dec. 2, 1890 |
| 446,719 | Stover | Feb. 17, 1891 |
| 723,567 | White | Mar. 24, 1903 |
| 939,965 | Aronson | Nov. 16, 1909 |
| 1,139,689 | Lyon | May 18, 1915 |
| 1,750,191 | Pierce | Mar. 11, 1930 |
| 1,909,550 | Pierce | May 16, 1933 |
| 1,997,167 | Bryce | Apr. 9, 1935 |
| 2,036,024 | Daly | Mar. 31, 1936 |
| 2,076,717 | Fuller | Apr. 13, 1937 |
| 2,090,920 | Stuivenberg | Aug. 24, 1937 |
| 2,181,996 | Knutson | Dec. 5, 1939 |
| 2,381,862 | Beattie | Aug. 14, 1945 |

FOREIGN PATENTS

| | | |
|---|---|---|
| 555,009 | Germany | July 19, 1932 |